United States Patent

[11] 3,616,088

| | | |
|---|---|---|
| [72] | Inventor | Stanley M. Weir<br>Palo Alto, Calif. |
| [21] | Appl. No. | 67,437 |
| [22] | Filed | Aug. 27, 1970 |
| [23] | | Division of Ser. No. 765,116, Oct. 4, 1968,<br>Pat. No. 3,536,207. |
| [45] | Patented | Oct. 26, 1971 |
| [73] | Assignee | FMC Corporation<br>San Jose, Calif. |

[54] WAREHOUSE CARRIER WITH LABEL MEANS THEREON
7 Claims, 21 Drawing Figs.

[52] U.S. Cl. ................................................. 156/542,
156/361, 156/384
[51] Int. Cl. ................................................. B44c 31/00
[50] Field of Search ...................................... 214/16.41
A; 156/542

[56] References Cited
UNITED STATES PATENTS

| 3,033,392 | 5/1962 | Bauman et al. | 214/16.4 A |
| 3,072,253 | 1/1963 | Ridenour | 209/111.5 |
| 3,343,692 | 9/1967 | Armoz | 214/16.4 A |
| 3,407,926 | 10/1968 | Rosser | 214/16.4 A X |
| 3,539,064 | 11/1970 | Kahn | 214/16.4 A |
| 3,369,952 | 2/1968 | Rieger | 156/577 |

*Primary Examiner*—Gerald M. Forlenza
*Assistant Examiner*—Raymond B. Johnson
*Attorneys*—Francis W. Anderson and C. E. Tripp ABSTRACT: A warehouse comprises a carrier having means for supporting an order-picking operator, a plurality of labels, said labels containing indicia for at least indicating the location of the articles in the warehouse and the destination of the articles picked, and means on said carrier for placing each label on the picked article.

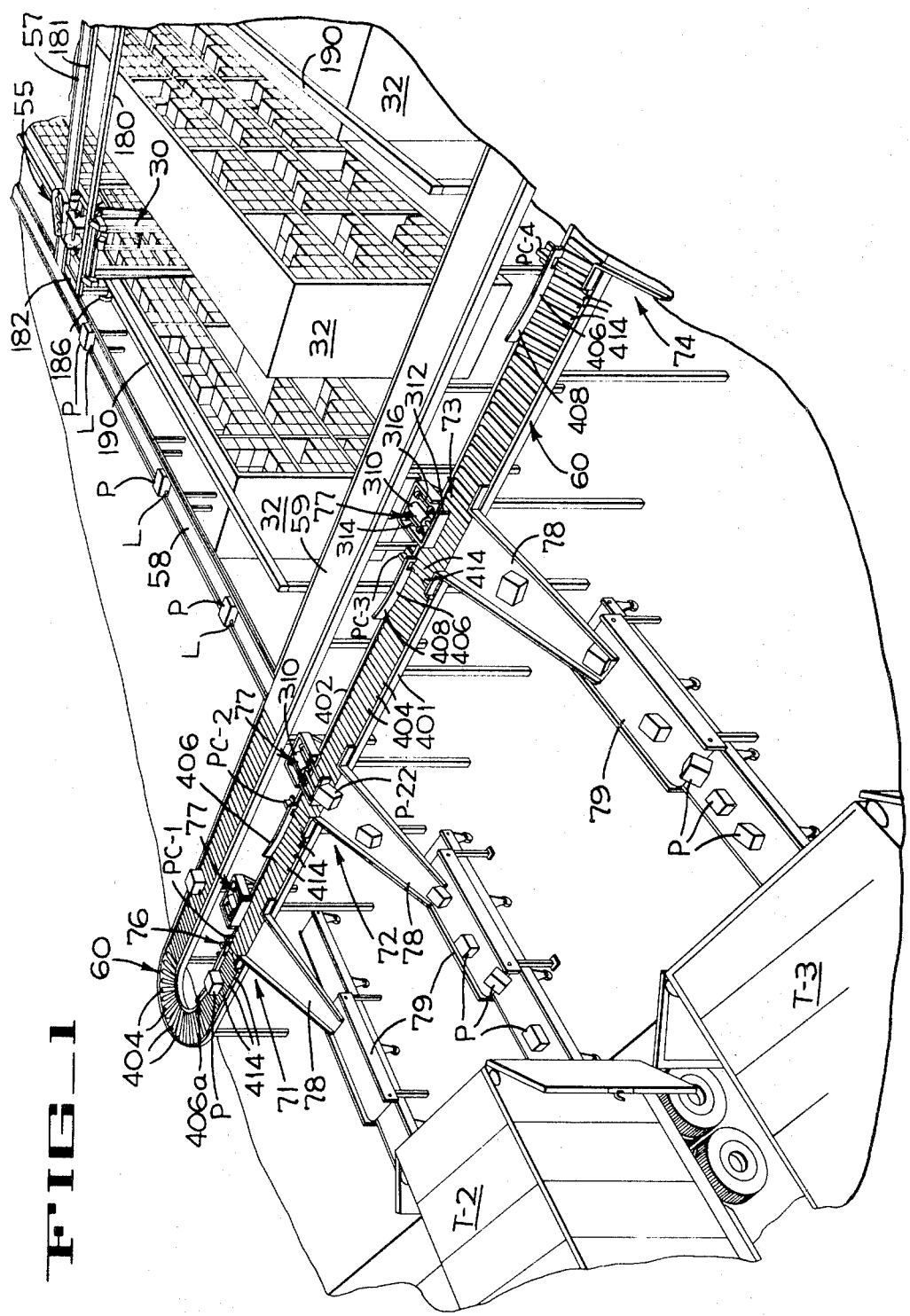

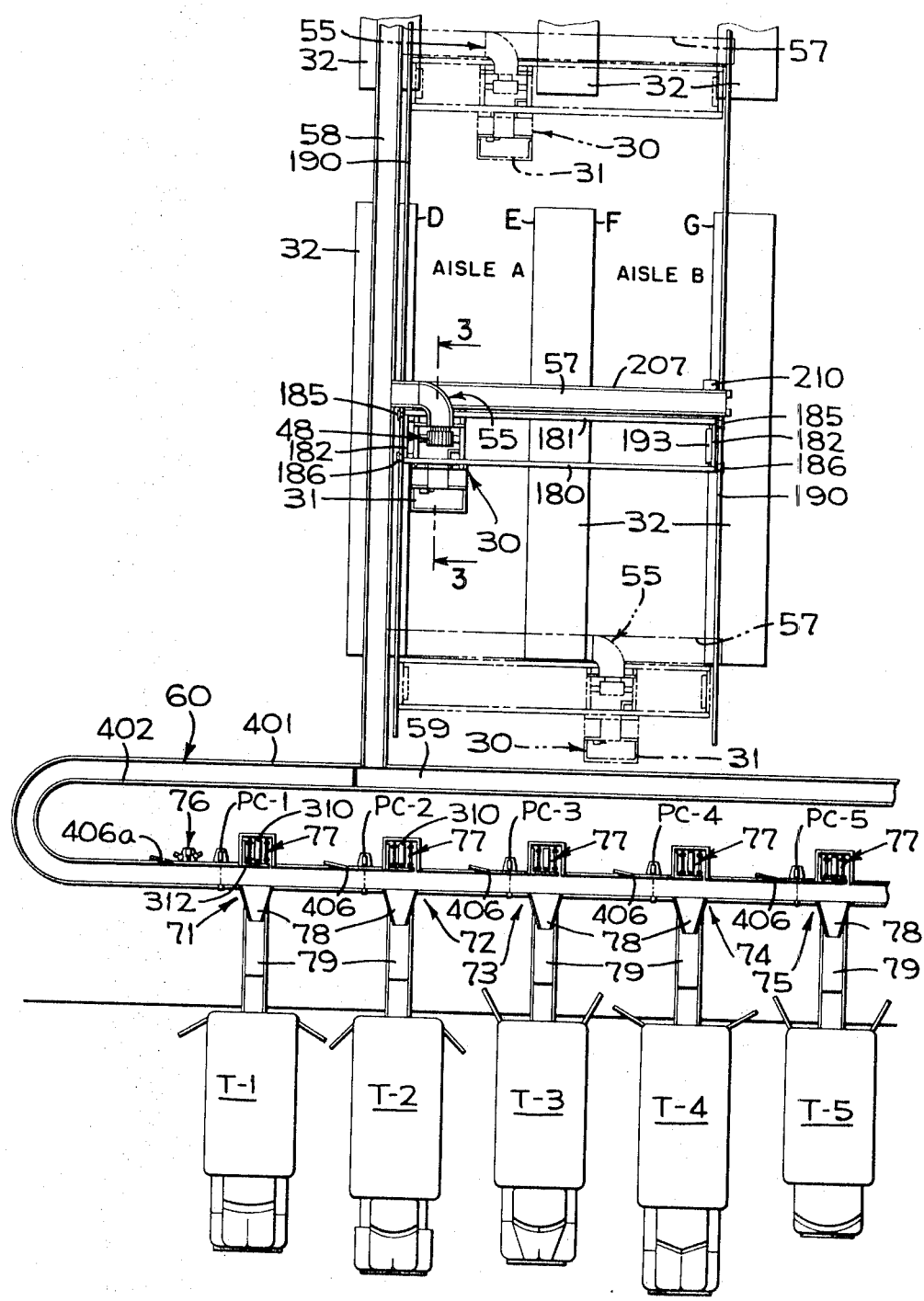
FIG_2

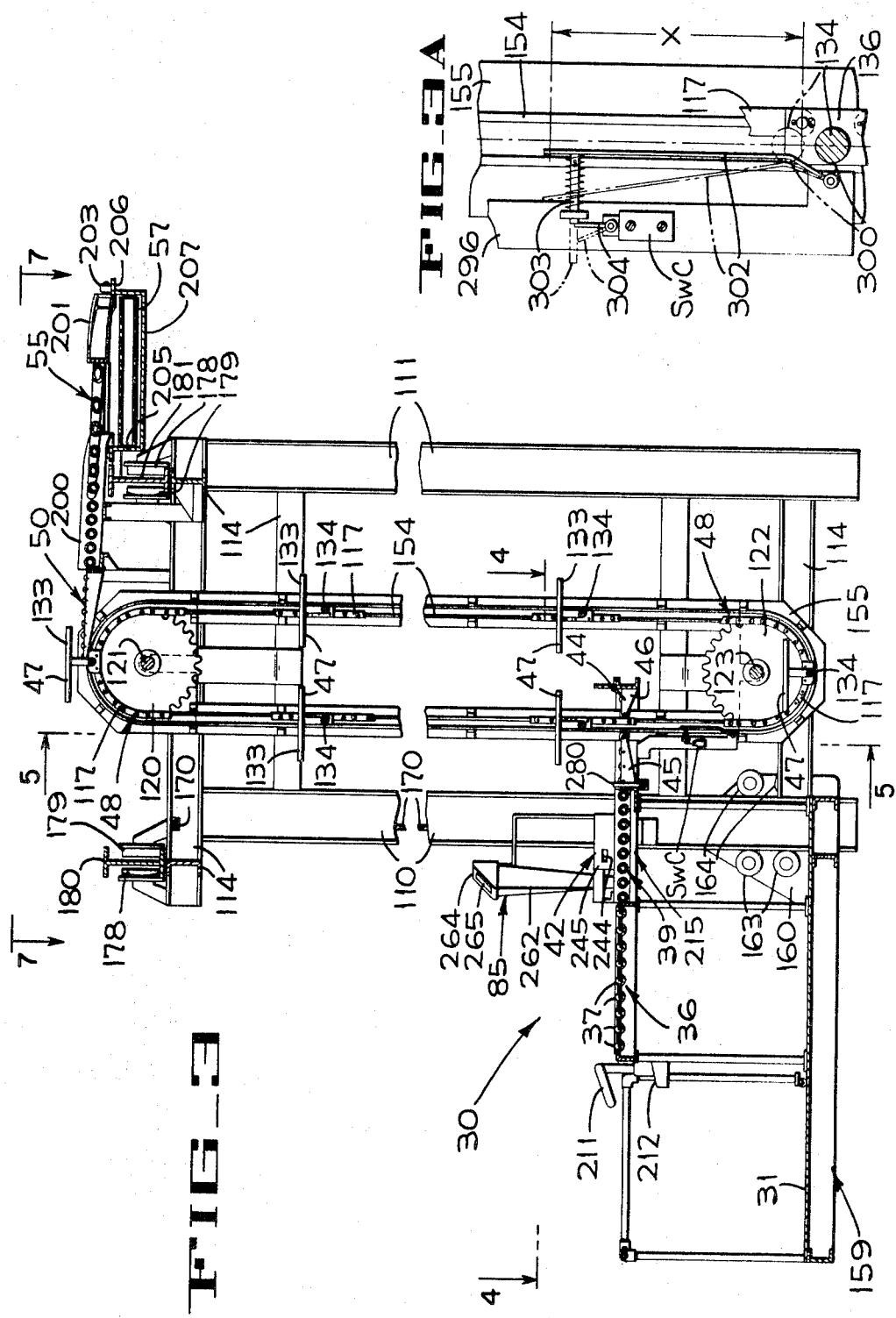

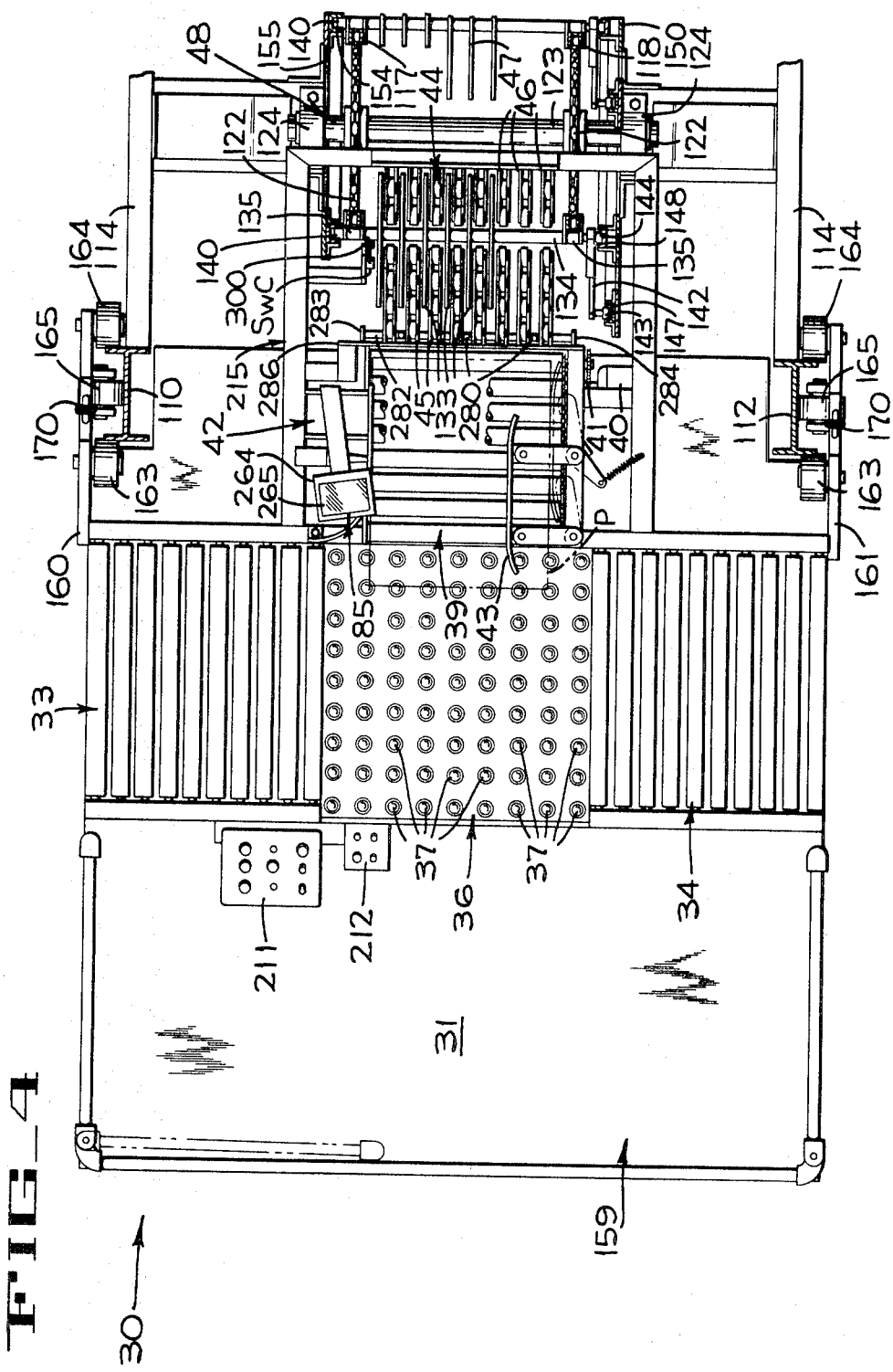

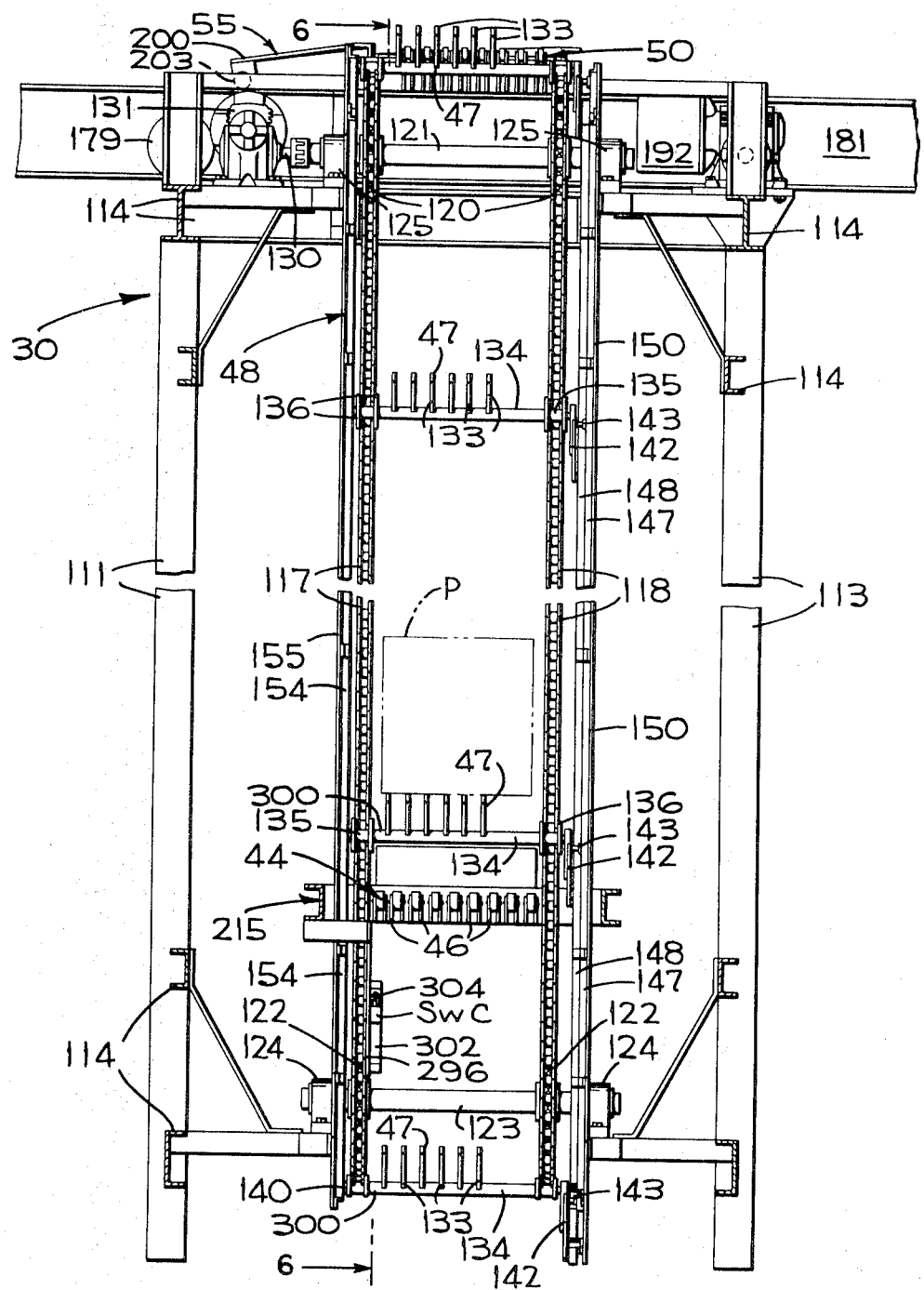
FIG_5

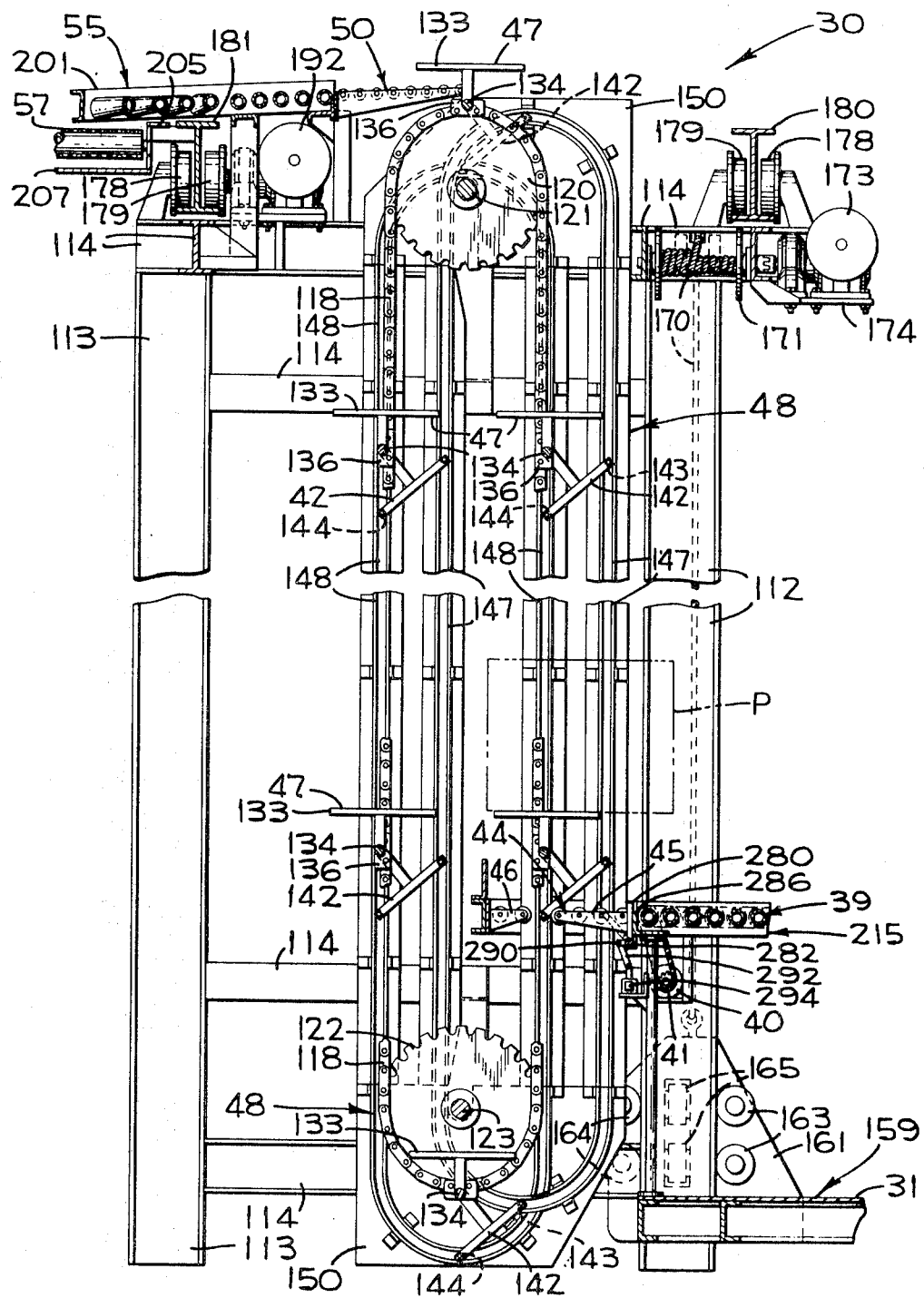
FIG_6

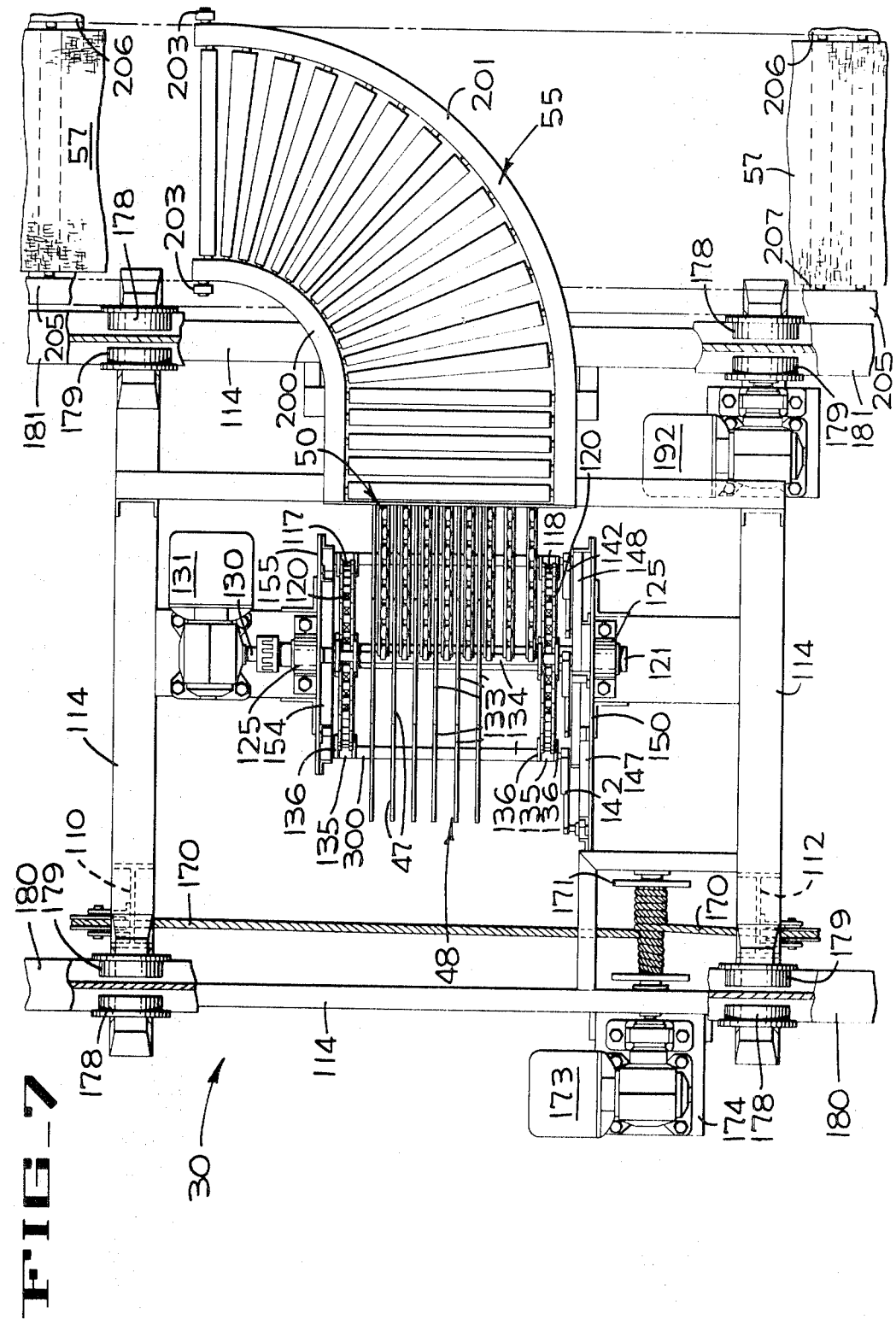

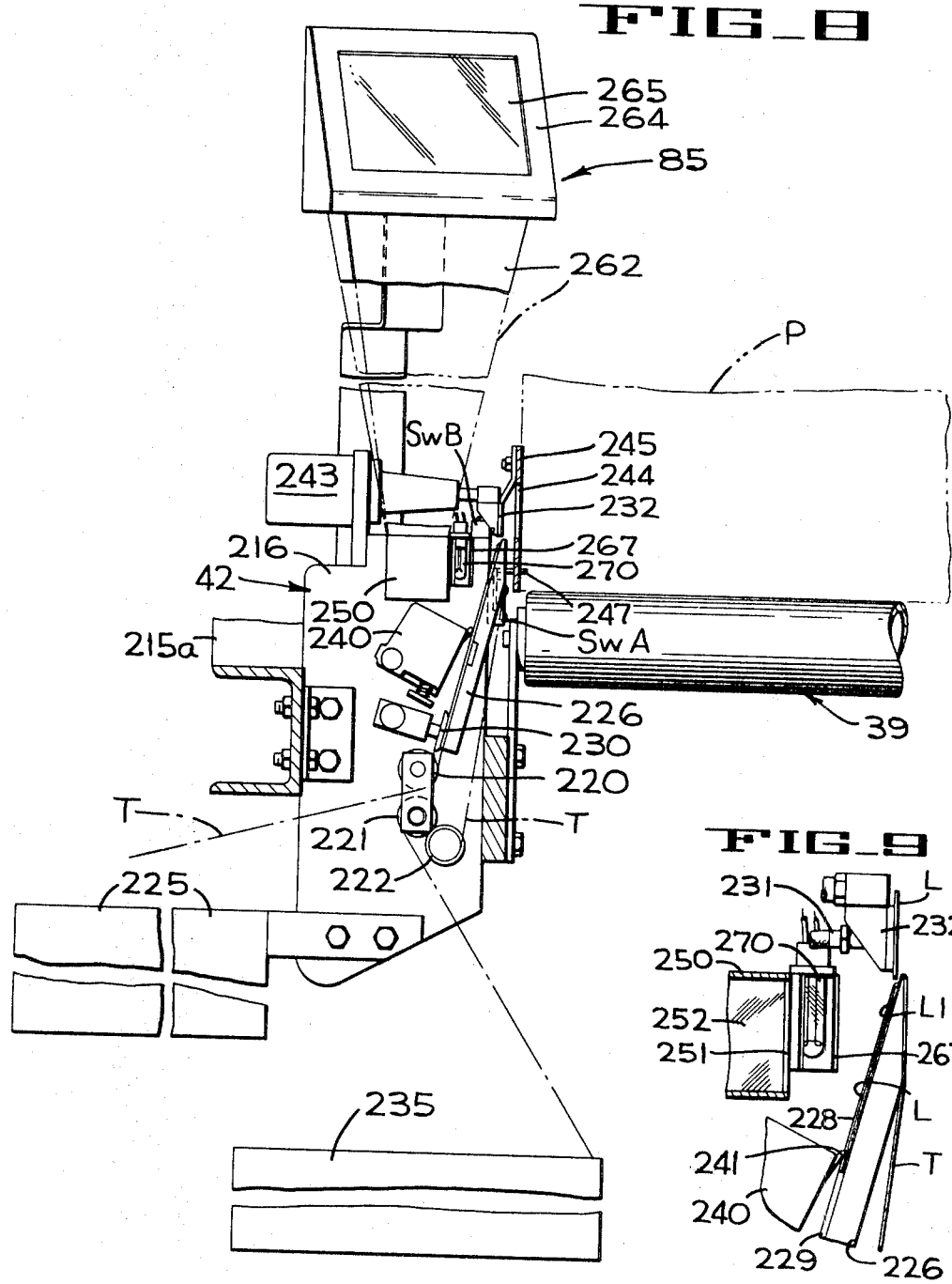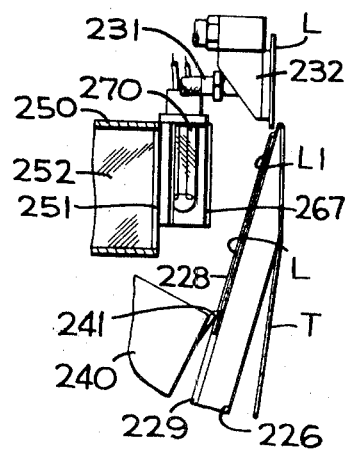

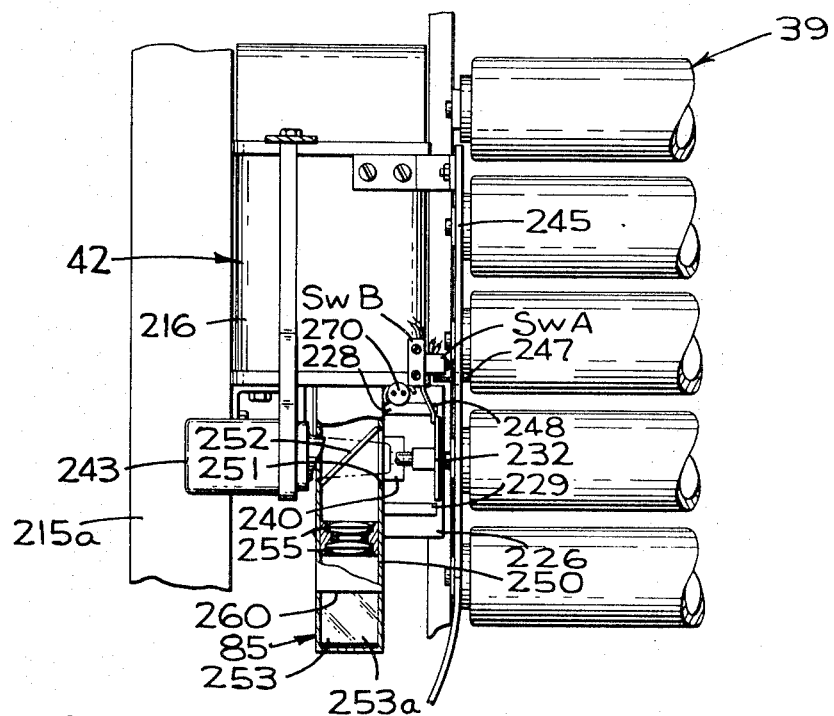
FIG_10
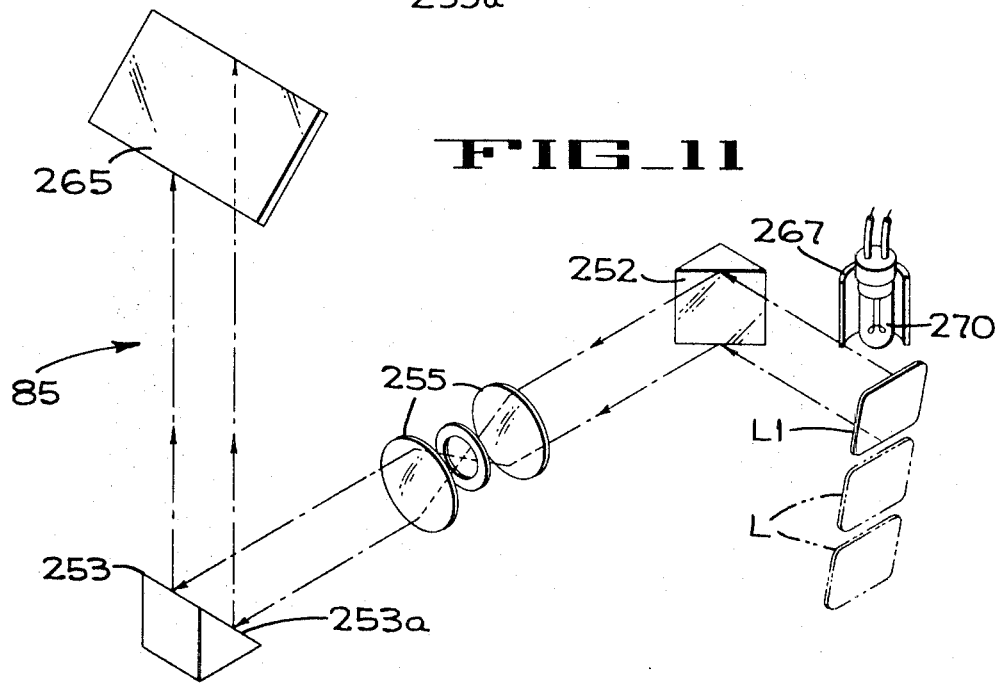
FIG_11

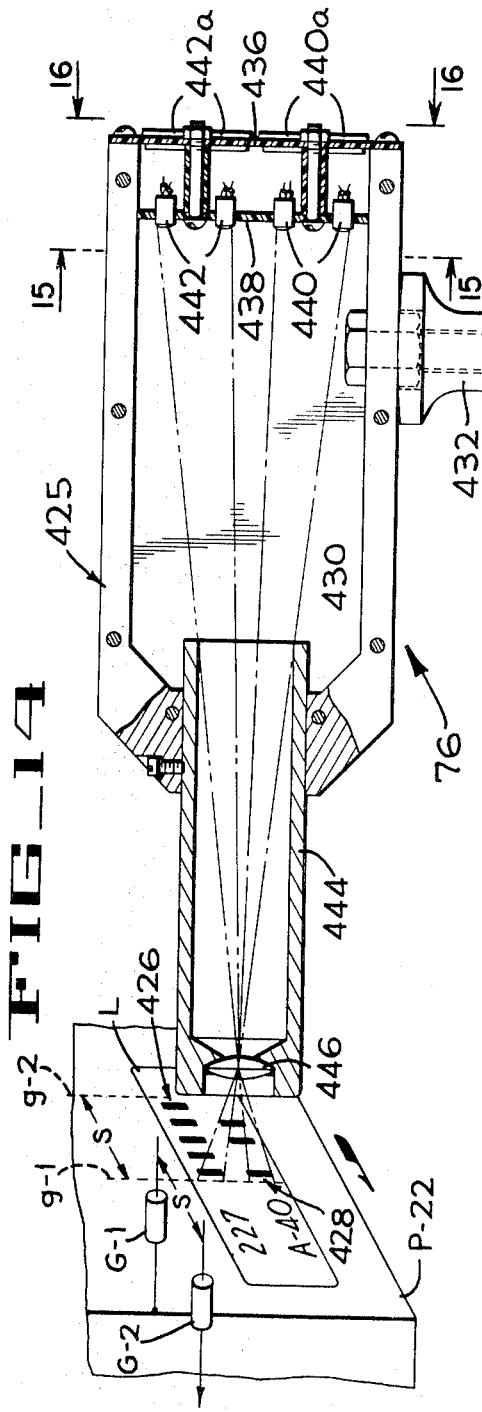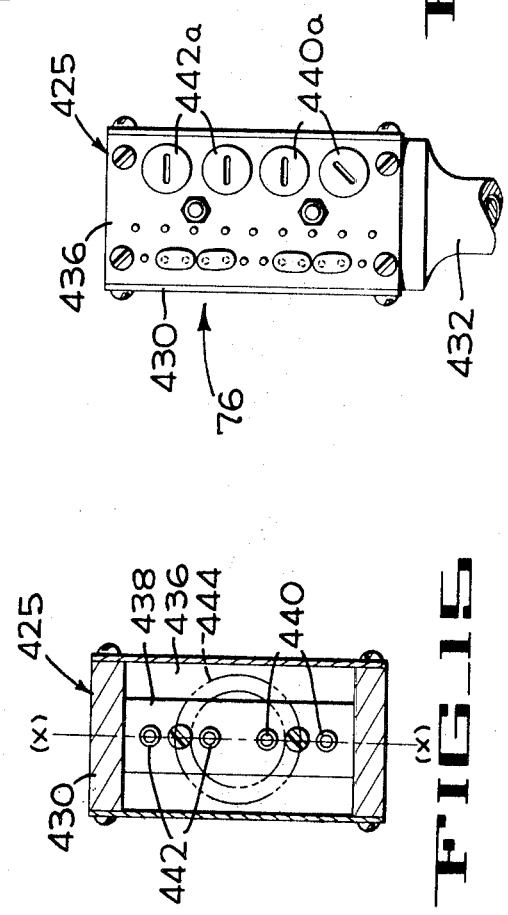

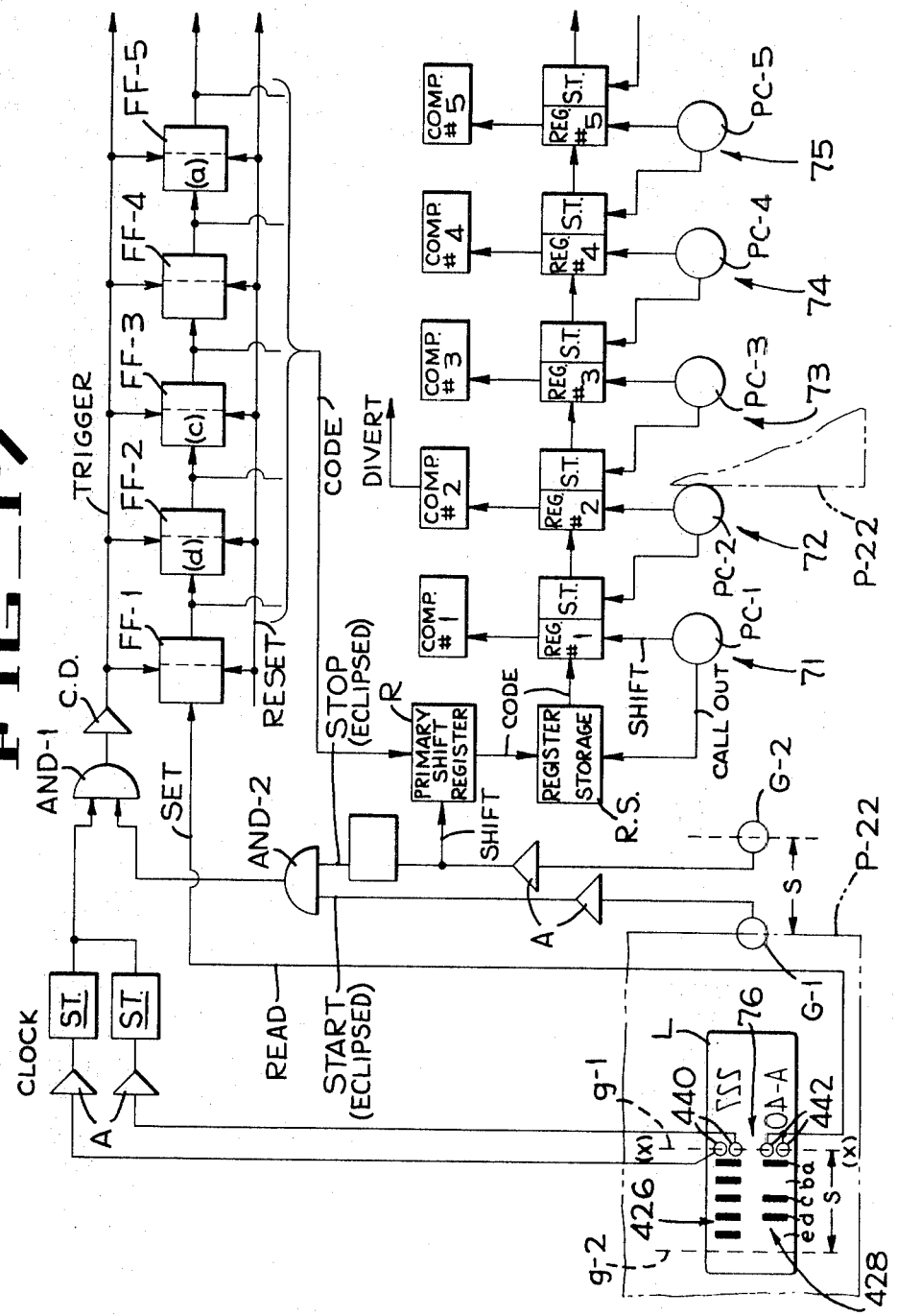
FIG_17

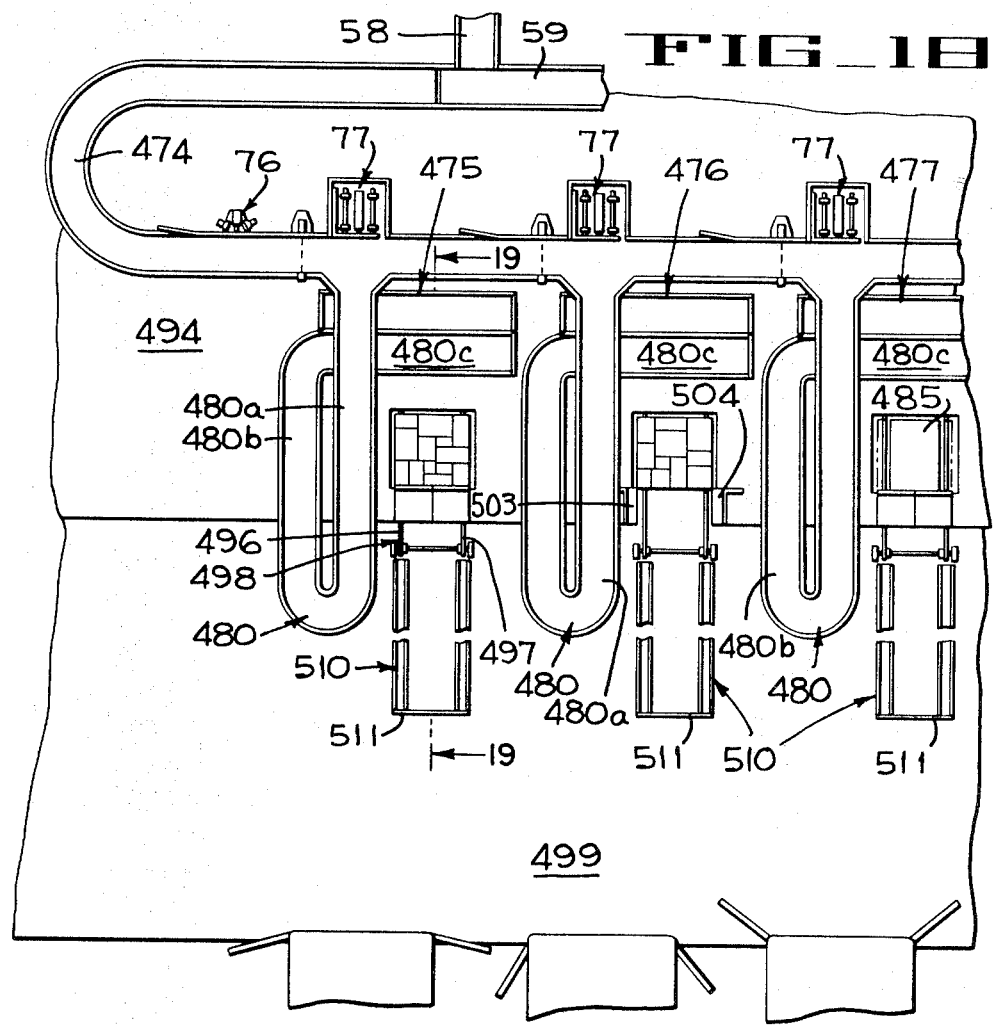
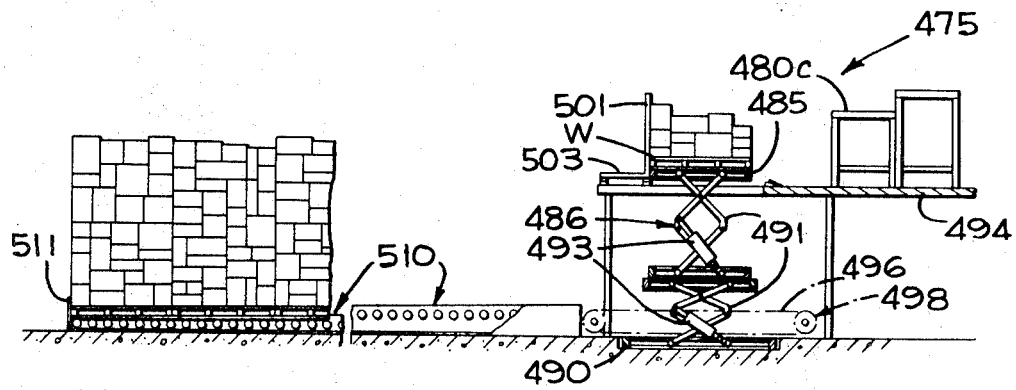

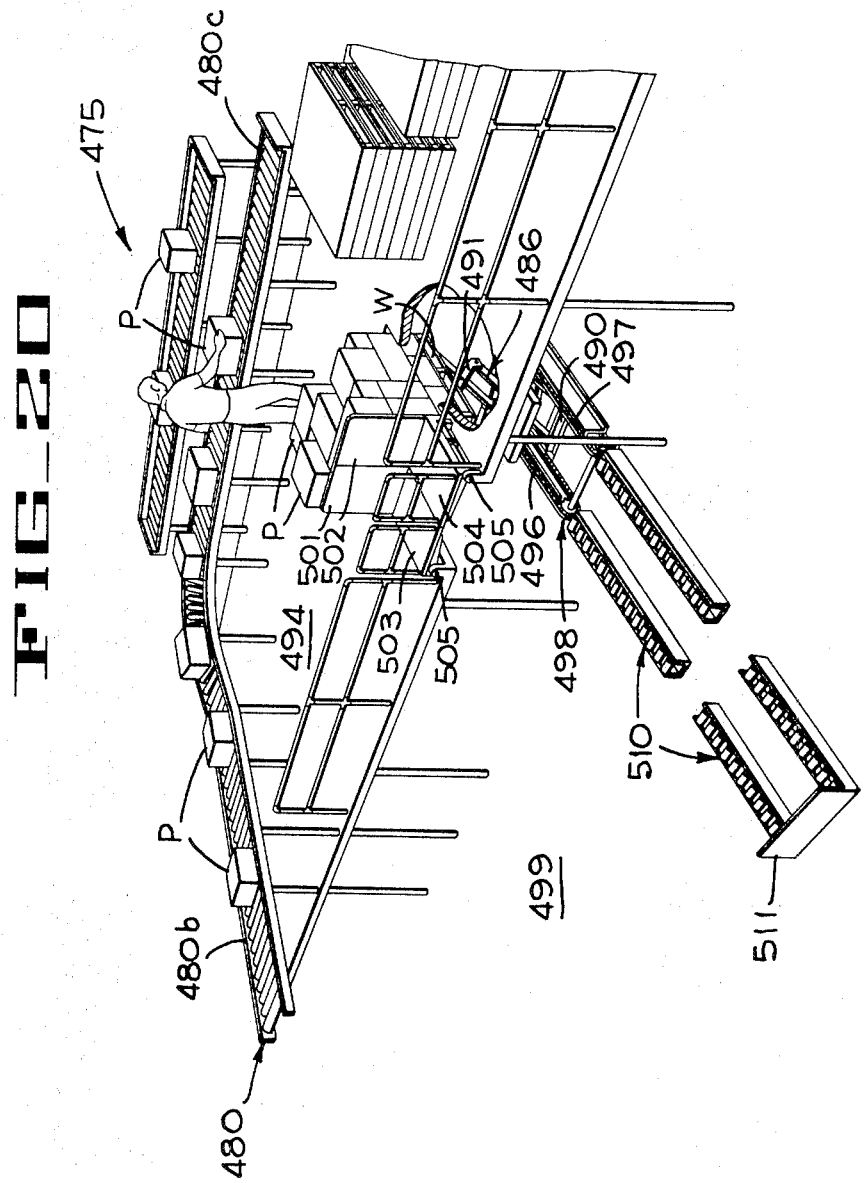

WAREHOUSE CARRIER WITH LABEL MEANS THEREON

This application is a division of my copending application Ser. No. 765,116, filed Oct. 4, 1968 now U.S. Pat. No. 3,536,207 issued Oct. 20, 1970.

This invention relates to a warehousing system and, more particularly, concerns an improved series of mechanisms that make possible the efficient picking of orders for a plurality of stores from the storage bins of the warehouse, directing the order of each store to a designated loading zone, and loading the order.

Heretofore it has been customary, when orders were received from a plurality of stores, to pick the order for each store separately from the orders of other stores by having an operator work his way up and down the aisles of the warehouse selecting the articles for the particular order assigned to him. In some systems the sequence of articles on the list was coordinated with the location of the articles in the storage bins so that the operator could progress along the aisles without being required to backtrack to complete the order. However, it will be noted that this system requires that the operator traverse the aisles once for each order that he fills.

It has been found that, by using the equipment of the present invention, the orders of several stores can be selected by an operator during one passage along the aisles of the warehouse.

Accordingly, it is an object of the present invention to provide a warehousing system having an efficient pallet loading mechanism.

Another object is to provide an improved warehousing system wherein selected articles for a given destination are palletized at the loading zone rather than in the warehouse aisles.

Other and further objects, features and advantages of the invention will be apparent from the following description taken in connection with the accompanying drawings in which:

FIG. 1 is a fragmentary perspective illustrating a portion of the warehouse system of the present invention.

FIG. 2 is a plan view of the warehouse system.

FIG. 3 is an enlarged vertical section taken along line 3—3 of FIG. 2.

FIG. 3A is an enlarged view of a portion of FIG. 3.

FIG. 4 is an enlarged horizontal section taken along line 4—4 of FIG. 3.

FIG. 5 is an enlarged fragmentary vertical section taken along line 5—5 of FIG. 3.

FIG. 6 is a fragmentary vertical section taken along line 6—6 of FIG. 5.

FIG. 7 is an enlarged fragmentary plan, partly broken away, taken along line 7—7 of FIG. 3.

FIG. 8 is a fragmentary, more-or-less schematic side elevation, with parts in section, of the labeling and displaying units of the machine of FIG. 3.

FIG. 9 is an enlarged fragmentary view of a portion of FIG. 8.

FIG. 10 is a fragmentary horizontal section taken along line 10—10 of FIG. 8.

FIG. 11 is a diagrammatic view of the label-displaying unit of the present invention.

FIG. 14 is a vertical section through the label reader and a diagram of its relation to a labeled package and a pair of gate sensors.

FIG. 15 is a section taken on line 15—15 of FIG. 14.

FIG. 16 is an end view of the reader housing viewed as indicated on line 16—16 of FIG. 14.

FIG. 17 is a schematic diagram of the sorting circuit.

FIG. 18 is a fragmentary schematic plan of a second embodiment of the warehousing system of the present invention.

FIG. 19 is a fragmentary section taken along line 19—19 of FIG. 18.

FIG. 20 is a fragmentary schematic perspective of one loading station of the system of FIG. 18.

Figure 12:
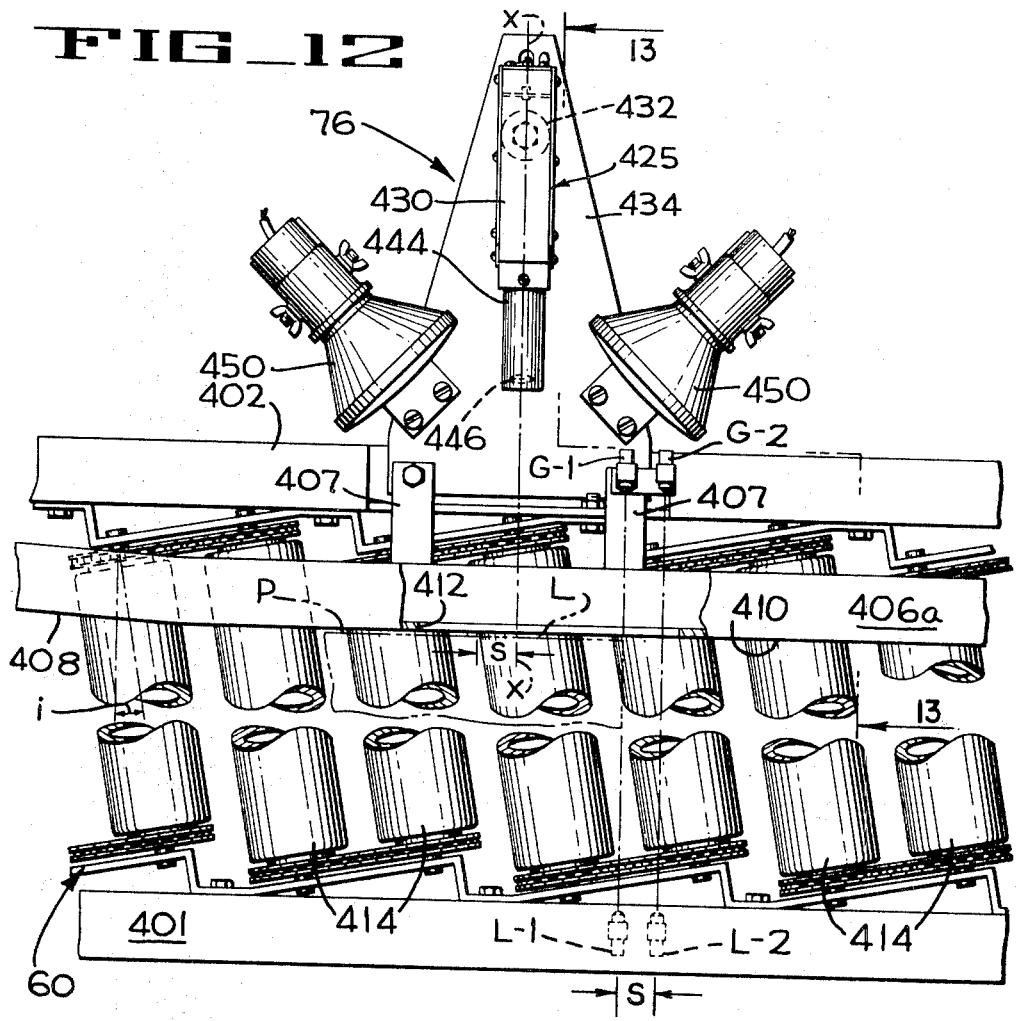
FIG. 12 is a fragmentary plan of the sorting conveyor at the label reader.

In the embodiment of the invention selected for disclosure in FIGS. 1 and 2, the reference numeral 30 indicates generally a vehicle having a platform 31 (FIG. 2) on which an operator stands as he reads data contained on labels fixed on previously prepared tape and picks orders from the many open-sided bins 32 of a warehouse in accordance with the data on the labels. As seen in FIG. 1 the bins are arranged in vertical rows, each row having three separate bins, and each bin being adapted to store a plurality of individual units of a particular commodity, such as cartons of soap chips. For the purposes of the present disclosure it will be assumed that different commodity is stored in each bin. While standing on the platform 31 (FIGS. 3 and 4), the operator removes each article from the bin, pushes it along a short roller conveyor 33 or 34, depending upon whether the bin he is emptying is on his right or his left, to a central table 36 that has a plurality of freely rotatable balls 37 projecting upwardly to support the article. The operator then turns it if necessary to give it the desired orientation and propels the article forwardly onto a roller conveyor 39, the rollers of which are power driven from a motor 40 through a chain drive 41 to carry the article past a labeler 42 while a spring-loaded guide plate 43 maintains the article against the face of the labeler. Continued movement of the article brings it onto a platform 44 (FIG. 4) formed by two sets of opposed cantilever fingers 45 and 46, the fingers of each set being spaced from the fingers of the other set and from each other to permit the upward passage of a plurality of forks 47 of an upright elevating conveyor 48. In passing through the cantilevered fingers of platform 44, each fork lifts an article off the platform and carries it to an elevated position at the top (FIG. 3) of the elevating conveyor 48. As the fork starts to move downwardly along the rear side of the conveyor 48, the tines of the fork pass through a second cantilevered finger unit 50 that acts as a stripper member to remove the article from the fork and convey it onto roller conveyor 55 (FIG. 7) which is effective to turn the article through 90° and discharge it onto a belt conveyor 57. Referring again to FIG. 1, it will be seen that the belt conveyor 57 delivers the article to a second belt conveyor 58 without changing its orientation. The conveyor 58, in turn, discharges the article onto a power driven belt conveyor 59, without changing its orientation, and belt 59 leads to a power-driven roller conveyor 60 which will be referred to as a sorting conveyor. Five discharge stations 71–75 (FIG. 2) are disposed in spaced relation along one run of conveyor 60, each station being associated with the loading zone assigned to a particular store and each station being provided with a pushoff mechanism 77, and one of the article-sensing photocells PC-1 to PC-5 inclusive, that cooperates with a label-reading unit 76 to actuate the pushoff mechanism.

An important feature of the warehouse system is the provision of indicia on each label that indicates the store to which the article is to be delivered. The reading unit 76 inspects the markings on the label and is capable of storing the information received from the markings. Each photocell activates the circuits of the unit 76 so that a comparison is made and, if the proper indications are obtained, the associated diverter is activated to cause the article to be pushed onto a chute 78 which delivers it to a conveyor 79 of the particular loading station.

Another feature of the warehouse system is the provision of numbers on the labels that can be read by the operator as he picks the articles from the bin. One number on the label indicates the type of article, and a second number indicates how many articles of that particular type must still be picked by the operator. As will be described presently, the labels are carried one after the other on a carrier tape, and the labels are so arranged that the labels for a particular type of article and for all five stores are preprinted on the carrier in consecutive order. To illustrate the arrangement of the labels on the carrier tape, a portion of a tape will be described that is arranged for an order in which 10 units of item No. 100 have been ordered by store No. 1, nine units by store No. 2, eight units by store No. 3, seven units by store No. 4, and six units by store No. 5, the order consisting of a total of 40 units that must be picked. Accordingly 40 consecutive labels are printed with the item No. 100 on each label and the labels are numbered starting with 40 and ending with zero. A viewer 85 (FIG. 3) is operatively connected to the labeler so that the operator can see a projection of the label next behind the label that will be placed on the article he has just propelled onto the labeler conveyor 39. Accordingly, the second label of the above-mentioned sequence will tell the operator that there are 39 more articles of type No. 100 to be picked; and when the projection of the last label of the sequence appears on the viewer 85, it will indicate that the operator is then handling the last article of the group of 40.

The bins 32 may be formed by any rigid structural members such as sheet steel, channels and angles secured together to form a rigid structure. The bins are open at both ends and have solid floors adapted to support pallet loads of articles. In a preferred arrangement, the operator's picking vehicle 30 travels in an aisle between two lines of bins with the front face of one line of bins on his left side and the front face of the second line of bins on his right side. With this arrangement, the bins are reloaded by means of forklift trucks that move along the rear side of the bins and are actuated to insert the pallet loads of articles into the bins through the openings in the rear side of the structure. The floors of the bins may be slightly inclined downwardly from the rear to front so that the articles on the pallets will have a tendency to move to the forward part of the pallet within easy reach of the operator. However, an arrangement such as that shown in FIG. 2 may be used wherein the vehicle 30 travels in aisles A and B formed by four lines D, E, F and G of bins 32. With this arrangement, the bins are replenished by inserting pallet loads of articles into the bin openings at the front of the bins.

The embodiment of the operator's vehicle 30 shown in FIGS. 3–7 comprises a rigid frame structure including four vertical I-beams 110, 111, 112 and 113 connected by rigid transverse and longitudinal members such as channels and I-beams 114. The elevating conveyor 48 is an endless member comprising a pair of chains 117 and 118, each of which is trained around an upper sprocket 120 secured to a shaft 121 and around a lower sprocket 122 secured to a shaft 123. The shaft 123 is journaled for rotation in spaced bearings 124, and the upper shaft 121 is journaled in bearings 125 and connected through a coupling to a shaft 130 that is driven by a motor 131. The several forks 47 of the elevating conveyor are carried by the chains, each fork comprising a plurality of T-shaped members 133 (FIGS. 5 and 6) that are welded to a transverse mounting bar 134. As shown in FIG. 7, at each end a reduced diameter portion of bar 134 is rotatably journaled in a sleeve 135 that is welded between special links 136 of the chains. At one end of the bar 134 a roller 140 is rotatably carried by a stub shaft (not shown) that is threaded into a tapped opening in the reduced diameter end of the bar 134. At the opposite end, a T-shaped control lever 142 (FIG. 6) is clamped on an end portion of the reduced diameter portion of the mounting bar 134 alongside the special chain links.

In order to keep the article on the forks as they are moved vertically, the upper surface defined by the several T-shaped members of each fork is maintained in a substantially horizontal plane due to the engagement of rollers 143 and 144 (FIG. 4) carried on the spaced outer ends of the T-shaped control lever 142. These rollers 143 and 144 ride in guide tracks 147 and 148 respectively, said tracks being oval in configuration and being formed by rigid members of channel cross section. The tracks are secured to a large vertical plate 150 that is fixed to the frame structure of the vehicle, with track 148 being disposed inwardly of track 147 as seen in FIG. 4. The roller 140 at the other end of each transverse mounting bar 134 is disposed in a fixed oval track 154 that is mounted on an oval, vertical backing plate 155 (FIG. 3) that is also supported in fixed position by the frame structure of the machine.

The platform 31 on which the operator stands is part of a rigid frame structure 159 which has the short roller conveyors 33 and 34 and the ball bearing table 36 mounted thereon. At the end of the platform 31 that is adjacent the elevating conveyor 48, two lifter plates 160 (FIG. 3) and 161 (FIG. 6) are welded to the side of the carriage. The plate 160 is adjacent the vertical I-beam 110 (FIG. 4) and the plate 161 is adjacent the I-beam 112, and each plate has two rollers 163 bearing against a vertical face of the adjacent beam, two rollers 164 bearing against the other face, and two rollers 165 bearing against the web of the beam. A cable 170 (FIG. 6) is secured to the upper end of each plate, and both cables are wrapped around a drum 171 (FIG. 7) that is rotatably journaled in the frame structure and arranged to be driven by a reversible motor 173 which is mounted in fixed position on a bracket 174 (FIG. 6) at the upper end of the support structure of the vehicle.

The vehicle is arranged to move transversely of each aisle by means of pairs of rollers 178 and 179 (FIG. 7) that are rotatably mounted on the upper end of the vehicle and ride along a pair of transverse I-beams 180 and 181 (FIG. 1) that are secured together at their ends by structural members 182 to form a rigid frame carrier. Two rollers 185 and 186 (FIG. 2) are rotatably mounted on the carrier frame at each end, each roller being arranged to ride along the top surface of a fixed rail 190. The roller 179 at the lower right-hand corner of FIG. 7 is driven by a variable speed motor 192 (FIG. 7), and rotation of this roller will cause the vehicle to move along the I-beams 180 and 181 of the carrier structure transversely of the aisle. If desired, the roller 179 at the lower left-hand corner of FIG. 7 may also be connected by a drive shaft to motor 192. Certain of the rollers 185 and 186 (FIG. 2) of the I-beam carrier are driven by an electric motor 193 in the manner that is conventional for overhead cranes and the like. Accordingly, the operator can move the vehicle down one side D (FIG. 2) of aisle A and return along the opposite side E of the aisle A and, when the I-beam carrier frame is past the ends of the bins, the vehicle can move transversely of the aisles from the aisle A to second aisle B. Again, the operator can maneuver the vehicle along one side F of aisle B and return alongside G. Thus, the vehicle can move longitudinally and transversely of each aisle, and can move from one aisle to the next.

The curved conveyor section 55 (FIG. 7) is made up of a plurality of freely rotatably tapered rollers and cylindrical rollers that are rotatably mounted in two curved frame members 200 and 201. As seen in FIG. 6, the conveyor section 55 is inclined downwardly and is mounted at one end in fixed position on the frame structure of the vehicle and is supported at its other end by two rollers 203 (FIG. 7) that are carried by the conveyor section and ride along the upper surface of sidewall members 205 and 206 (FIG. 3) of the endless belt conveyor 57. The sidewalls 205 and 206 are part of a channel shaped member 207 that is supported from the adjacent I-beam 181 and from the structural members 182 at the ends of the I-beams 180 and 181 that unite the I-beams to form a rigid carrier. Thus, the conveyor 57 moves with the I-beams and supports the end of the curved conveyor section 55. The belt of the conveyor 57 is an endless member driven in a conventional manner by a motor 210 (FIG. 2) that is mounted on the channel shaped member 207.

The labeler 42 may be of the type marked by Avery Label Company of Monrovia, Calif. under Model No. 200. This labeler is mounted in fixed position on a frame support structure 215 (FIG. 4), that also mounts the cantilever fingers 45 and 46, and in general comprises a housing 216 (FIGS. 8 and 10) that is secured by suitable brackets to a horizontal structural channel 215a of the structure 215. The housing 216 is a completely closed member which encloses drive mechanisms and control mechanisms. Three rollers 220, 221 and 222 are mounted exteriorly of the housing on shafts that extend into the housing, roller 220 being a rotatable guide roller, roller 221 being a pressure roll, and roller 222 being a pull roll. The tape T (FIG. 9) on which the labels L are secured in spaced relation is carried in folded form in an open-top container 225

(FIG. 8) from which is fed upwardly around the guide roll 220 (FIG. 8) and onto a heated plate 226. While on the plate 226, the tape T is held between two spaced guide plates 228 and 229 (FIG. 9) and a pressure shoe 230 engages the upper surface of the labels. The forward end of the heated plate is V-shaped and the tape is bent downwardly around the edge so that each label is automatically peeled off the tape and is moved into the zone of control of air being drawn into a suction tube 231 that is mounted on a presser foot 232. Thus each label is drawn against the presser foot 232 and is held in this position with its adhesive-covered surface facing an opening 233 in a sideplate 234 of the conveyor 39. The tape that is bent downwardly around the edge of the plate 226 is trained clockwise around pull roller 222 and then counterclockwise around roller 221. The pull roller 222 is power driven to rotate clockwise and the rotation of the pull roller and its coaction with the pressure roll 221 causes the tape to be drawn downwardly. This downward pull on the tape is the sole moving force for the label-bearing tape which is finally deposited, after the labels have been removed, in a receptacle 235.

A sensor unit 240 (FIG. 8) is mounted on the housing 216 and is provided with a spring-loaded finger 241 (FIG. 9) that rides along the top of each label and drops into the space between that label and the label next behind. As will be explained presently, when the finger drops into a space between labels, the motor that drives the pull roller 222 is deenergized and the advancing of the tape stops. It will be evident, of course, that the finger 241 is so located that, when it stops the movement of the tape, a label has just been removed from the upper end of the tape and is held by suction against the presser foot 232.

The presser foot 232 is connected to the plunger of an air-operated power cylinder 243 (FIG. 8). When the cylinder is activated, the foot 232 moves forwardly through the opening 233 in the sideplate 234 to impress the label of an article, shown in phantom lines, being advanced by conveyor.

A switch SwA is mounted on the housing 216 and has an actuator 247 disposed in the path of movement of the article to be actuated by the article. When switch SwA is actuated by an article on the conveyor 39, it energizes a time delay relay which energizes a solenoid of a solenoid-operated valve in the air control circuit of the power cylinder 243. When the valve is actuated, the presser foot is moved forwardly to impress the label on the article, and then the presser foot is returned. As the presser foot moves rearwardly it engages the actuator 248 of a switch SwB (FIG. 10) and this switch activates a circuit to the motor that drives the pull roller 222. Accordingly, after a label has been impressed on the article and the presser foot is retracted, the pull roller advances the tape until the sensor finger 241 actuates an internal switch in the sensor unit and deactivates the circuit to the motor.

The vibrator 85 is mounted on the housing of the labeler and comprises a generally horizontal closed tube 250 (FIGS. 8 and 10) of square cross section that has an opening 251 in one sidewall and a mirror 252 disposed inside the tube adjacent the opening. g. A second mirror 253 that has its reflecting surface 253a (FIG. 10) disposed at about 45° to the horizontal is mounted at one end of the tube with a pair of lens 255 being disposed in the tube between the mirrors 252 and 253. An opening 260 (FIG. 10) is provided in the tube immediately above the mirror 253, and an upwardly and outwardly expanding housing 262 (FIG. 8) is secured to the tube 250, with the lower open end of the housing registering with the opening 260 and with the upper open end of the housing opening into a viewing box 264 that has a screen 265 facing the operator's station.

A lamp 270 (FIGS. 10 and 11) is mounted on the labeler adjacent the opening 251 in the tube 250, and it will be noted in FIG. 9 that the label L1, next behind the label L is held on the presser foot, is opposite the opening 251 in the tube 250. A reflector 267 is mounted partially around the lamp 270, causing the beams from the lamp to impinge on the label to illuminate it. The illuminated image is reflected by mirror 252, focused by lens 255, and reflected and redirected by mirror 253 onto the screen 265.

The controls for the various motors and other mechanisms of the vehicle 30 may be mounted on control panels 211 and 212 (FIGS. 3 and 4) that are positioned on the vehicle within easy reach of the operator.

Referring to FIG. 3, it will be noted that each article must be conveyed out onto the cantilevered fingers of platform 44 at a time when there is no set of forks 47 in the path of movement of the article. Accordingly, a plurality of stop pins 280 are mounted at the entrance to the platform 44 to prevent entry of an article at a time when a fork is moving through the fingers of the platform or is only a short distance above the platform. The stop pins 280 (FIG. 4) are mounted on a bar 282 that is pivotally mounted in short arms 283 and 284 projecting from a fixed frame member 286. A lever 290 (FIG. 6) is secured to the bar 282 and has a free end pivotally connected to a link 292 that is pivoted on the end of the plunger of a solenoid 294. The arrangement is such that, when the solenoid is energized, the lever 290 will be swung counterclockwise to lower the stop pins. When the solenoid is deenergized, the plunger will be projected out of the solenoid housing, and the stop pins will be swung upwardly until their upper ends are above the level of the article-contacting surfaces of the rollers of the cantilevered fingers to stop an oncoming article.

In order that the stop pins are lowered and held in lowered position for a predetermined interval, a switch SwC (FIG. 3A) is mounted on a support plate 296, that is secured to and depends from the structure forming the platform 44 and is arranged to be actuated by a portion 300 (FIG. 5) of each rod 134 that mounts the forks 47. As the rod portion 300 moves upwardly, it engages a spring-loaded switch actuator 302 (FIG. 3A) which has a push rod 303 arranged to engage a switch arm 304 of switch SwC. As soon as the switch arm 304 is pivoted counterclockwise, a circuit is completed to energize the solenoid 294 and lower the stop pins. The stop pins will remain in lowered position until the switch arm 304 is permitted to return to the full line position shown in FIG. 3A. This will happen only when the bar portion 300 has almost moved out of contact with the top end of the switch actuator 302. Accordingly, the stop pins are held in lowered position while the upwardly moving fork moves a distance approximately indicated by the letter X in FIG. 3A. During this time an article can be advanced out onto the platform 44 above the upwardly moving fork.

As previously mentioned, each article is discharged from conveyor 57 onto conveyor 58 and from conveyor 58 to conveyor 50 without the orientation of the article being changed. If there should be any tendency of the article to turn as it moves onto the receiving conveyor, the end portion of the discharging conveyor can be inclined slightly away from the right-angle positions relative to the receiving conveyors shown in FIG. 2, so that the article will finally assume a position on the receiving conveyor wherein its sidewalls are generally parallel to its direction of advance on the receiving conveyor. Alternately, guides can be provided on the receiving conveyor to reorient a slightly turned article.

Each of the several pushoff or diverter units 77 may be of the type disclosed in the U.S. patent to Brunner et al. No. 3,181,685 and, in general, may include a pneumatic power cylinder 310 (FIG. 1), an article contact plate 312 connected to the outer end of the piston of cylinder 310, guides 314 and 316 for the plate 312, and valve means (not shown) for directing air under pressure to and venting it from the cylinder. The valve may be actuated by a solenoid that is energized when an electric pulse is received by a label-reading control and sorting system that will be explained in detail presently.

As previously described, and referring to FIGS. 1 and 2, articles or packages P bearing labels L are distributed through the various feeder conveyors 58 to the endless sorting conveyor 60. The packages are carried to a sorting zone and past a sequence of sorting or diverting stations 71–75. After having been viewed by a single package viewer 76, the packages are selectively diverted into chutes 78, onto conveyors 79, for delivery to trucks T-1 to T-5 respectively.

It is the function of the sorting system to read the machine code placed on the labels L (FIG. 14) and to cause diversion of the packages at the preselected sorting stations 71-75. In order to accomplish this, in the sorting system to be described, the package viewer 76 is mounted upstream of the first sorting station 71. This is the only viewer required, and it scans the labels and reads the machine code thereon. The coded information is stored in a register, and as the packages P pass in front of the pushoff mechanisms or diverters 77 at the respective sorting stations 71-75, their positions are successively sensed by photocell and lamp assemblies PC-1, PC-2, etc. at the respective sorting stations (FIGS. 1 and 2). In the manner to be explained in connection with the diagram of FIG. 17, the sorting system, including the viewer 76, the photocells and the diverters 77, will cause diversion of the packages at the sorting stations. In accordance with the machine code information on the labels L, which information was imprinted on these labels in the manner previously described.

The endless sorting conveyor 60 is specially constructed to facilitate reading the coded information on the labels L, and sensing the position of the packages as they pass the sorting or diverting stations. This conveyor construction appears in FIGS. 1, 2, 12 and 13, to which reference is now made. The sorting conveyor 60 includes spaced parallel side rails 401, 402 and, along the majority of its length, conventional power driven rollers 404 are mounted for conveying the packages. The drive for these rollers is also conventional, and the details thereof are not critical to the present invention.

Figure 13:
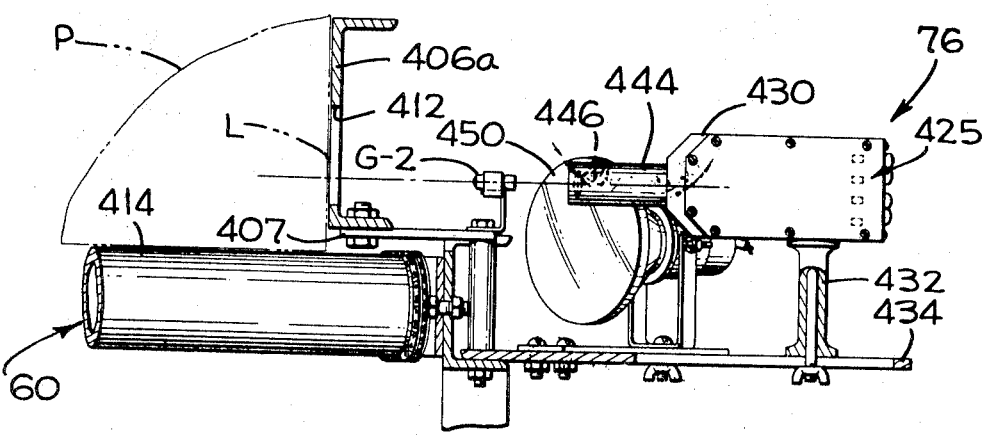
FIG. 13 is a section taken on line 13—13 of FIG. 12.

Means are provided to insure that the packages are properly positioned in front of the viewer 76, are also accurately positioned at the photocells, and are close to the diverters 77 at each of the sorting stations. In order to accomplish this, a package-facing rail 406 is mounted upstream of each of the sorting stations 71-75. The rail upstream of station 71 is a special rail 406a, for accommodating the viewer 76. The rails 406, 406a are supported on the side rail 402 by horizontal brackets 407 (FIGS. 12 and 13). The rails have a lead-in ramp portion 408 and a longitudinally extending guide portion 410 (FIG. 12). The ramp portion 408 extends upstream and merges with the inner side rail 402 (FIG. 1) so that packages that are adjacent to or riding along the inner rail 402 of the conveyor 60, can slide along the ramp portion 408. In order to provide a line of sight to the packages P from behind the rails, each of the rails is apertured at 412 (FIGS. 12 and 13) to provide optical windows.

For precise reading of the labels on the packages it is necessary that the packages be held against the rail 406a as they move in front of the viewer 76. It is also advantageous to have the packages held against the rails 406 as the packages move past the photocells at the various sorting stations and as they move in front of the diverters 77, in order to minimize shock forces upon diversion. For this purpose, special sets of rollers 414 are provided at each of the rails 406, 406a. As seen in FIG. 12, the axes of the rollers 414 are inclined by a small angle $i$ relative to a plane that is normal to the side rails 401, 402. This inclination of the roller axes is provided by special zigzag mounting plates 416, 418 bolted to the side rails 401, 402, respectively. The rollers 414 are driven in a conventional manner by a set of chains 420, the details of the drive not being critical to the invention. Due to the inclination angle $i$, the rollers continuously press the packages against the rails 406, 406a as they slide along these rails. This means that the labels L are always positioned exactly the same distance from the optics of the viewer unit 76 during the label-reading operaration.

In the embodiment of the invention disclosed, the viewer 76 is designed to operate with labels L having certain characteristics and positioned on a package in a predetermined position. Referring to FIG. 14, a label L is shown affixed to a package P-22, which, as will be described presently, is a package the diversion of which will be explained. The Arabic number 227 on the label is an arbitrary number which, in this case, can be assumed to be a sequence number applied at the labelling machine indicating the number of a given type article to be picked, but otherwise having nothing to do with the sorting code. The indicia A-40 appearing on the label will, in this example, be considered to be a code designation for the selected category of article being picked, and thus has no relation to the code except that it indicates the contents of the package.

A row designated 426 of spaced bars extends along an upper portion of the label. These bars are printed on the label with suitable media and provide synchronizing (trigger) pulses commonly referred to as the "clock" in data handling circuits of the type to be described. Below the clock indicia is a row, indicated at 428, of printed indicia that represents the machine code for a preselected one of the sorting station 71-75. In the present example, there are five clock symbols and there are spaces for five code symbols. The code symbols in the row 428 are applied and spaced so that they and the blanks between can be interpreted as a binary code. Thus, the five spaces provide for up to 32 sorts, depending upon the number and the position of the bars in the code row 428. In FIG. 14 the indicia in the code row 428 can be considered to represent a number 10110 (binary) or 22 (base 10). The code number 22 is arbitrarily assigned for purposes of explanation to sorting station 72.

The viewer 76 will now be described in more detail in connection with FIGS. 14-16. The viewer includes a label-reading unit 25 having a housing 430 that is adjustably mounted on a vertical post 432 projecting from a baseplate 434 mounted on the conveyor rail 402 (FIGS. 12 and 13). The housing is closed by a rear end plate 436 which, by means of screws and spacers, mounts a phototransistor board 438. Two phototransistors 440, for reading the clock indicia 426 are mounted at the lower portion of the board 438, and a pair of code-reading phototransistors 442 is mounted at an upper portion of the board 438. The signals from the transistor pairs 440, 442, are balanced by adjustable potentiometers 440a, 442a, to provide uniform, dependable operation.

In order to provide an image of the clock and code on the phototransistors (which may themselves have small condenser lenses) an objective lens tube 444 is slidably mounted in the housing 430, for focusing an objective lens 446 provided in the tube. The labels are illuminated when they pass in front of the window 412 at the reader (FIGS. 12 and 13) by a pair of floodlamps 450.

With this design, the images of the clock indicia in the row 426 are impressed upon the clock phototransistors 440 and the same relationship exists between the code indicia 428 and the phototransistors 442. The phototransistors are paired in order to accommodate vertical shifting of the label L from its nominal position on the package. This, coupled with the fact that the indicia are vertical bars and that the phototransistors are wired to operate in parallel, means that minor vertical variations in the indicia positions will not impair operation of the sorting system.

Means are provided to prevent markings on the labels or packages other than the clock and code indicia in rows 426 and 428 (FIG. 14) from providing signals to the phototransistors. In the system illustrated, this is accomplished by insuring that no pulses can be effective until a clear zone on the label, just downstream from the visual indicia information, is aligned with the vertical plane $x-x$ of the phototransistors. Furthermore, the signal generating circuit is, in effect, disabled after the machine code indicia have passed the same vertical plane $x-x$, and while a clear portion of the label is at that plane. Thus two imaginary lines, as indicated by the dashed lines $g-1$, $g-2$ in FIGS. 14 and 17, represent the boundaries of effective reading of material on the label. These lines are spaced in the direction of package movement by a distance $s$, which is determined by the physical makeup of the labels.

This label property is utilized by a pair of photocell gate units G-1, G-2 which are positioned to sense the leading edge of a package when it eclipses the light beams of these units. When the package is moving along in front of the reader in the direction of arrow 2, its leading edge first eclipses the photocell unit G-1 (FIGS. 14 and 17). At this time, the vertical boundary line $g$-1 of the scan area will coincide with the vertical plane $x$—$x$ of the label reader 425. It will be noted that this is a clear zone in the label, so that there are no markings that will cause the phototransistors to provide a pulse. After the package has traveled a distance equal to the distance $s$, the machine code will have been examined, and the boundary line $g$-2 will pass the vertical plane of the label reader. At this time, the leading edge of the package, which will have moved the same distance S, will eclipse the beam of the gate photocell G-2. This will prevent the circuit from responding to any pulses that might be generated by the phototransistors. As seen in FIG. 12 the gate photocells G-1, G-2 are mounted on a bracket 407 and are illuminated by conventional photocell lamps L-1, L-2 to provide the beams that can be eclipsed by the leading edges of the packages as they pass in front of the label reader 425.

Instead of providing a separate analogue memory system for causing activation of the diverters when the packages reach their coded destinations, the sorting conveyor 60 serves as its own memory. This is made possible by a series of photocell and lamp units PC-1 to PC-5 inclusive (FIGS. 1 and 2) mounted just upstream of the diverters 77 at the sorting station 71, 72, etc. The photocells are mounted behind windows in the rails 406 which are similar to the window 412 for the viewer unit 76 shown in FIG. 12. As will be seen, as the packages eclipse the beams of the photocell units PC-1 to PC-5, coded diversion signals are called out and examined, and if they match the code for a given station 71-75, the associated diverter is actuated to remove the package from the sorting conveyor 60. Thus, each package and its label act as an escort type, memory type, system as will be explained.

The operation of a code sorting and memory system useable in conjunction with the viewer 76, including the gate photocell units G-1, G-2 and the package sensor photocell units PC-1 and the like will now be explained in connection with the schematic diagram of FIG. 17. As the label L passes the label reader, the machine code pulses are sent into a binary-type sequential storage register made up of a series of bistable multivibrators or flip-flops FF-1, FF-2, etc. As the label is read, the presence or absence of indicia is introduced successively into the flip-flops. These bits, $a$, $b$, $c$, $d$ and $e$ of information are sequentially advanced along the flip-flops during the code reading period. The binary information of the code is thus stored in the sequential register in inverse order, the first bit being in the last flip-flop (FF-5). Thus, with the binary code 10110 shown in the drawings, successive code pulses are generated by the code indicia, the pulses are advanced along the chain of flip-flops until five code positions have been examined. The bit 1 at position $a$ will be in flip-flop FF-5, there will be bit 0 in FF-4, there will be bits 1 in FF-3 and FF-2, and bit 0 in FF-1. This advance of the coded information sequentially along the line of multivibrators FF-1, FF-2, etc. is triggered by the clock indicia 428 on the label. Thus, the impressing of the code in the flip-flop register is self-synchronizing and independent of package velocity.

With this understanding of the relation of the label to the sequence register, and assuming knowledge of conventional electronic information handling units such as shift registers, comparators or logic circuits, pulse amplifiers, Schmitt triggers, voltage inverters, etc. a sorting sequence will now be further explained in connection with the schematic diagram of FIG. 17.

When a package P-22 bearing the code marks 10110 (corresponding to the base 10 number 22, and sorting station 72), the entire circuit will have been reset to its ready or bit 0 condition. This condition remains as the visual label indicia 227 and A-40 are carried past the label reader 425, with which the leading edge of the package P-22 eclipses the beam of the gate photocell unit G-1. At this time, the vertical plane $x$—$x$ of the label reading unit 425 (and hence the phototransistors 440, 442) will be aligned with the imaginary boundary lines $g$-1, previously described.

As the package proceeds, the first clock code indicia in row 426 is sensed by the phototransistors 440. Each of the transistors 440 is connected to a conventional voltage amplifier A, the outputs of which pulse a Schmitt trigger S.T. The outputs of the Schmitt trigger are connected in parallel to a conventional AND circuit indicated as AND-1. Thus, when each of the clock indicia pass under the phototransistors 440, a trigger pulse is set into the AND-1 circuit.

If the label L is properly positioned on the package P-22, the leading edge AND-2. will have just eclipsed the light beam of the gate photocell unit G-1. This provides a START pulse signal, amplified in a conventional amplifier A, which pulses an AND-2 circuit. The other input to the AND-2 circuit is from a voltage inverter, connected with the circuit of the gate photocell unit G-2. The latter unit has not been eclipsed by the package and so is in its normal condition. The G-2 circuit is such that when not eclipsed, the signal from its inverter connected to the AND-2 circuit is of the same polarity as that from the gate circuit G-1 when the latter is eclipsed. Thus, with G-1 eclipsed and G-2 clear, two signals enter AND-2 and the latter provides a pulse to AND-1. This condition prevails while the package moves from G-1 to G-2, by the distance $s$, and thus there is a voltage output from AND-2. Thus, during reading, AND-1 receives both clock and gate voltages and hence can pass the clock pulses onto a conventional cathode driver amplifier C.D. which triggers all of the flip-flops.

The phototransistors 442 are also reading the row 428 of code indicia. The "set" voltage pulses from the code-reading transistors (bit 1 pulses) occur while the trigger voltage is applied to the flip-flops, so that these voltages add and are adequate to flip FF-1, thereby advancing the bit to the output side of the latter and simultaneously setting FF-2. The trigger voltage alone is incapable of accomplishing this. This action continues in accordance with well known principles, the result being that after the label has been scanned through the zone $s$ on the label, the binary code number 10110 (indicia at zones $a$, $c$ and $d$, corresponding base 10 number 22) is set into FF-5, FF-3 and FF-2 as indicated in FIG. 17. This code is impressed into the receiving side of a conventional primary shift register R.

It is important that this information be unaffected by package marks outside the zone $s$ on the label. This is insured by the stop photocell gate unit G-2. When a package has traversed the distance $s$ from its position at G-1 to eclipse the beam of G-2, the code will have been fully scanned by the instrument. At the time when G-2 is eclipsed, a STOP pulse (FIG. 17) will be transmitted from G-2 to the associated inverter and into AND-2. This pulse is inverted relative to the pulse from G-1 so that when both G-1 and G-2 are eclipsed (as is the case when the box proper passes the label reader), the inputs to AND-2 are of different polarity and hence there is no input from AND-2 to AND-1. There now can be no output from AND-1. Thus, regardless of what pulses come in from the clock circuit, there will be no output from the AND-1 circuit and hence no trigger voltage will be available for the flip-flops.

At the same time that the package eclipses the beam of G-2, a shift signal is sent by G-2 to the primary register R. This register is formed of conventional voltage storage units and stores the entire code (voltages $a$, $c$ and $d$ in the example) as a unit. The shift signal from G-2 advances this information into a register storage unit R.S. so that the primary register R is cleared and ready for the next label information.

When the trailing edge of package P-22 reaches the first station 71 (base 10 code No. 21), the beam of photocell PC-1 which was eclipsed, is restored. Restoration sends a "Call Out" signal to the register storage R.S., which shifts the code into register No. 1 corresponding electrically to station 71. The use of trailing edge sensor circuits of this type is a conventional expedient. This code is compared by a comparison unit No. 1, which checks to see if the code now in register No. 1 corresponds with the code built into the comparison unit. The comparison units are conventional electronic logic circuits, well known in the art, and the details of such are not critical to the present invention. If the codes do not match at station 71, no diversion signal is produced for the diverter 400 at the station.

Restoration of the beam of photocell unit PC-1 also sends a "shift" signal to register No. 1 through a time delay circuit (not shown) of conventional design, so that after time for code comparison with register No. 1 has been provided, the coded information is shifted from register No. 1 into a storage register S.T., associated with that register. Here the coded information rests, ready for further comparisons, and register No. 1 is cleared ready for the coded information of the next package.

The package is advanced by the conveyor 60 until it eclipses and restores the beam of the photocell unit PC-2 at station 72. This is the station that has a base 10 code designation 22, corresponding to that on the label. When PC-2 is eclipsed and then restored by the trailing edge of the package P-22, it sends a callout signal to the storage register S.T. of register No. 1, and shifts the code therein into register No. 2 for station 72. The comparison is now made with comparator No. 2, but this time the codes will match, and a diversion signal will be sent onto the associated diverter 77. An instant later, the shift signal from PC-2 becomes effective on register No. 2 and shifts the coded information into the associated storage register S.T. However, this is of no consequence insofar as the present package is concerned because it has already been diverted. Since none of the comparators Nos. 3, 4 and 5 have keys that will match the code, they will not operate diverters even though the code is successively passed along to the associated registers Nos. 3, 4 and 5 and checked by their comparators.

In order to insure dependable operation, a RESET line is connected in parallel to all of the flip-flops FF-1, FF-2, etc. This line is shown in FIG. 17, but no input connection appears. This line can be a relay switch that grounds the flip-flop when any of the diverters are operated, by a connection to the diverter circuits which is omitted from FIG. 17, for clarity.

Thus, so long as the label is properly positioned on the package as the imaginary START line g-1 on the label passes under the plane x—x of the label, reader 425, the leading edge of the box passes under the gate photocell unit G-1, and label reading can begin. Vertical displacement of the label is accommodated to some degree by the fact that the code bars are elongated in a vertical direction, and that the photo transistors are paired in the vertical plane. The horizontal position of the label need not be precise, so long as the critical blank spaces thereon are in the zone of imaginary lines g-1 and g-2, as described. The labels are scanned by the phototransistors so that all the bars must pass into the field of view of the optical system of the reader. This eliminates package velocity and code bar spacing effects. It will also be apparent that any number (up to 32 in the present example) of flip-flops and code-comparison registers can be applied to provide sorting for up to 32 sorting stations, with the five code bar positions shown in the present example.

OPERATION

In a warehouse using the system of the present invention, the various stores that are serviced by the warehouse will submit their orders to a data processing center where the order is entered in a computer such as a Model 360-30 computer marketed by International Business Machines Corporation of Armonk, N.Y. When the order has been properly programmed, the data is transmitted from the computer to a printout machine, such as the Model 1403 line printer which is also marketed by the International Business Machine Corporation. This printout machine is capable of imprinting in ink both the above-mentioned machine language and the numerical indicia that is optically displayed for the operator.

When the tape of labels has been printed, it is delivered to the order picker who reads the numerical indicia on the first label, places the tape in the receptacle 225, and threads it into the labelling unit. The tape will, of course, have a leading end portion that carries no labels and is long enough so that it can be guided between the rollers 221 and 222 and directed downwardly toward the receptacle 235.

By jogging the labelling unit, the first label is moved to a position on the presser foot 232, and the second label is moved to a position to be displayed on the screen 265. The operator then actuates the controls of the vehicle 30 to the proper bin location and raises or lowers the platform so that he can conveniently withdraw the articles from the bin and direct them past the labelling unit.

As each article passes the labelling unit its leading edge engages switch SwA and causes the presser foot to be projected forwardly to affix the label on the article at a predetermined distance from the leading edge of the article. During each return stroke of the presser foot, switch SwB is actuated to cause a new label to be positioned on the presser foot and held thereon by suction tube 231.

Since the operator is able to inspect the indicia on the screen 265 on the label that is destined for the article following the article that is moving toward or past the labelling unit, he can continue picking articles and having them ready for movement through the machine in a very efficient manner. Also, since each label indicates the number of articles of a particular category that must still be picked, the operator is kept informed as to how soon he will have to shift to a new bin to pick articles of another category. If desired, the last label for a particular category of articles can also carry indicia that will be projected on the screen and tell the operator what the next article category will be. With this arrangement he can prepare himself for actuating the proper controls to move the vehicle to the desired new location.

After being labeled, each article is moved out onto the cantilevered platform 44 where an upwardly moving fork 47 engages it from the underside, elevates it and discharges it onto the curved conveyor section 55. The article is then advanced by conveyors 57, 58, 59 and 60 toward the sorting zone and, during this advance, it passes the viewer 76 which, in cooperation with the photocells PC-1 to PC-5, effects the discharge of the article at the proper sorting station.

In the arrangement illustrated in FIGS. 1 and 2, the packages P must be removed from the loading tables to which they are delivered by the conveyors 79 and stacked on pallets in the trucks. While this system is suitable for certain operations, it has been found that a particularly effective system results when the pallets are loaded while they are outside the truck and then moved into the truck. Further, while it is ordinarily difficult for an operator to pile packages to the height that can be accommodated in a large truck, the present invention provides means whereby an operator can build a load to any desired height and, as a result, the truck can be efficiently loaded with pallet loads of the most suitable height for the truck without resorting to the time consuming operation of topping-off pallet loads within the truck.

In FIG. 18 is illustrated a system wherein the packages that are advanced on a conveyor 474 are diverted at one of three loading stations 475, 746 or 477. It will be understood that the conveyor 474 is identical to the conveyor 60 of FIG. 2 and that the label-reading equipment and package diverters are identical to those shown in FIG. 2. While only three loading stations are shown in FIG. 18, it will be understood that five stations, or any desired number of stations may be used. It will be evident therefore, that the system of FIG. 18 differs from that of FIG. 2 only in that, in the FIG. 2 arrangement the packages are diverted onto chutes which deliver them to the conveyors 79 while in the FIG. 18 arrangement, the packages are diverted onto roller conveyors 480 each of which has a receiving run 480a, a return run 480b, and a storage run 480c (FIG. 20), that forms a selection table from which the operator can select packages as he builds up a load of packages on a pallet W that is resting on a platform 485 (FIG. 19) of a lowerator 486. Each lowerator 486 comprises a base 490, that might be rigidly bolted or otherwise anchored in a fixed support, and a scissors mechanism 491 that is secured to the base and carries the pallet-supporting platform 485 at its upper end. Each lowerator may be of the type marketed by American Manufacturing Co. of Tacoma, Wash. under the designation of Model No. 1258 Modified American Tandem Piggyback Lift Assembly and, in general includes two power cylinders 493 operatively connected to the links of the scissors mechanism to raise or lower the platform 485. It will be evident in FIG. 19 that when a load is to be built up on a pallet, the operator places the pallet W on the platform 485 and actuates a foot control unit to energize the power cylinders to bring the pallet to the height that is most convenient for him as he places packages on the pallet. When a layer of packages has been arranged on the pallet, the power cylinder is actuated to cause the pallet to be lowered a short distance. In this way, the operator carries on his pallet-loading operations at the level at which he can most efficiently form the layers.

It should be noted that the packages P will vary in size and shape and therefore the provision of a selection table on which a plurality of packages accumulate gives the operator a chance to select articles that will form a stable load.

Referring to FIG. 19 it will be noted that the scissors 491 extends through an opening in a work platform 494 and that, when the pallet support platform 485 is in a lowered position, it is positioned between two endless chains 496 and 497 (FIG. 20) of a power driven endless conveyor 498 whose upper runs travel along the truck-loading platform 499 (FIG. 18). The pallet W has side edge portions that overlap the side edges of the lowerator platform 485 and, accordingly, when the platform 485 is lowered to a position between the chains 494 and 495, the pallet comes to rest on the chains which will convey the loaded pallet away from the lowerator.

To aid the operator in assembling the load on the pallet, two backup plates 501 and 502 are provided to define one side of the pallet load. The plates 501 and 502 are integrally formed on platforms 503 and 504, respectively, each of which is pivoted by means of a pivot rod 505 to the work platform 494. While the load is being formed, the platforms 503 and 504 are disposed in the position shown in FIG. 20. When the load has been formed and the loaded pallet is ready to be discharged, the platform 503 is swung counterclockwise (FIG. 20) while platform 504 is swung clockwise to the positions shown at station 476 of FIG. 18. If desired a side plate could be mounted on the platform 494 to extend upwardly alongside either side of the pallet on the lowerator to the height of the plates 501 and 502 to define at least one more side limit of the load being assembled.

Referring to FIG. 19 the conveyor 498 delivers each loaded pallet onto a gravity roller conveyor 510 which has a stop plate 511 at one end. The loaded pallets are removed from conveyor 510 by means of a fork lift truck that approaches at right angles to the conveyor 510, lifts one pallet at a time and conveys it into the truck. It should be noted that the conveyor 510 provides a storage means on which several loaded pallets may accumulate. Therefore, the forklift operator can visually inspect the several loaded pallets and make a selection according to the relative weight of the loaded pallet. With this arrangement the distribution of the load in the truck can be controlled, it being desirable that the truck be loaded more heavily toward the center than toward its rear end.

From the foregoing description it will be evident that the present invention provides an efficient warehouse system wherein articles can be picked for a number of stores at once, rather than for each store individually. The arrangement for displaying the indicia on the label is completely new in the warehousing field, and the concept of mounting of the displaying unit on a labelling unit that itself can be mounted on a movable operator's platform makes possible the picking of orders in a manner that has heretofore been impossible.

What is claimed is:

1. Warehousing apparatus comprising a carrier, means on the carrier to support an order-picking operator, a plurality of labels, said labels containing indicia for at least indicating the location of the article in the warehouse and the destination of the articles picked, and means on said carrier for placing each label on the picked article.

2. Apparatus according to claim 1 wherein the labels are arranged in a predetermined order corresponding to the order in which the associated articles are to be picked.

3. Warehousing apparatus comprising a carrier adapted for movement along the aisles of a warehouse adjacent article storage bins or the like, means on said carrier to support on order-picking operator, a plurality of labels, said labels containing indicia for at least indicating the location of the article in the warehouse and the destination of articles picked, and label-dispensing means on said carrier for placing each label on an associated picked article.

4. Apparatus according to claim 3 wherein a sequence of said labels destined for a particular group of articles are ejected from said dispensing means in the order corresponding to the order in which said group of articles are picked from the storage bins.

5. Apparatus according to claim 3 wherein said labels are arranged in a substantially end-to-end single file in said dispensing means.

6. Apparatus according to claim 3 wherein the indicia on said labels includes human-readable characters and machine-readable characters.

7. Apparatus according to claim 3 wherein the indicia includes an indication of the category of article to be picked and the number of articles of that category remaining to be picked.

PO-1050
(5/69)

UNITED STATES PATENT OFFICE
CERTIFICATE OF CORRECTION

Patent No. 3,616,088         Dated OCTOBER 26, 1971

Inventor(s) STANLEY M. WEIR

It is certified that error appears in the above-identified patent and that said Letters Patent are hereby corrected as shown below:

Column 5, line 35:   change "of" to --on--.

Column 6, line 48:   change "50" to --59--.

Column 7, line 67:   change "operaration" to --operation--.

Column 8, line 29:   change "25" to --425--.

Column 10, line 13:  delete "AND-2." and insert --thereof--.

Signed and sealed this 20th day of June 1972.

(SEAL)
Attest:

EDWARD M. FLETCHER, JR.
Attesting Officer

ROBERT GOTTSCHALK
Commissioner of Patents

Disclaimer 3,616,088.—*Stanley M. Weir*, Palo Alto, Calif. WAREHOUSE CARRIER WITH LABEL MEANS THEREON. Patent dated Oct. 26, 1971. Disclaimer filed June 21, 1971, by the assignee, *FMC Corporation*.

Hereby disclaims all that portion of the term of the patent subsequent to Apr. 23, 1985.

[*Official Gazette September 12, 1972*]